M. ALTMAN.
APPARATUS FOR WELDING THE MEETING EDGES OF METALLIC ARTICLES.
APPLICATION FILED JAN. 18, 1912.
Reissued June 29, 1915. 13,941.
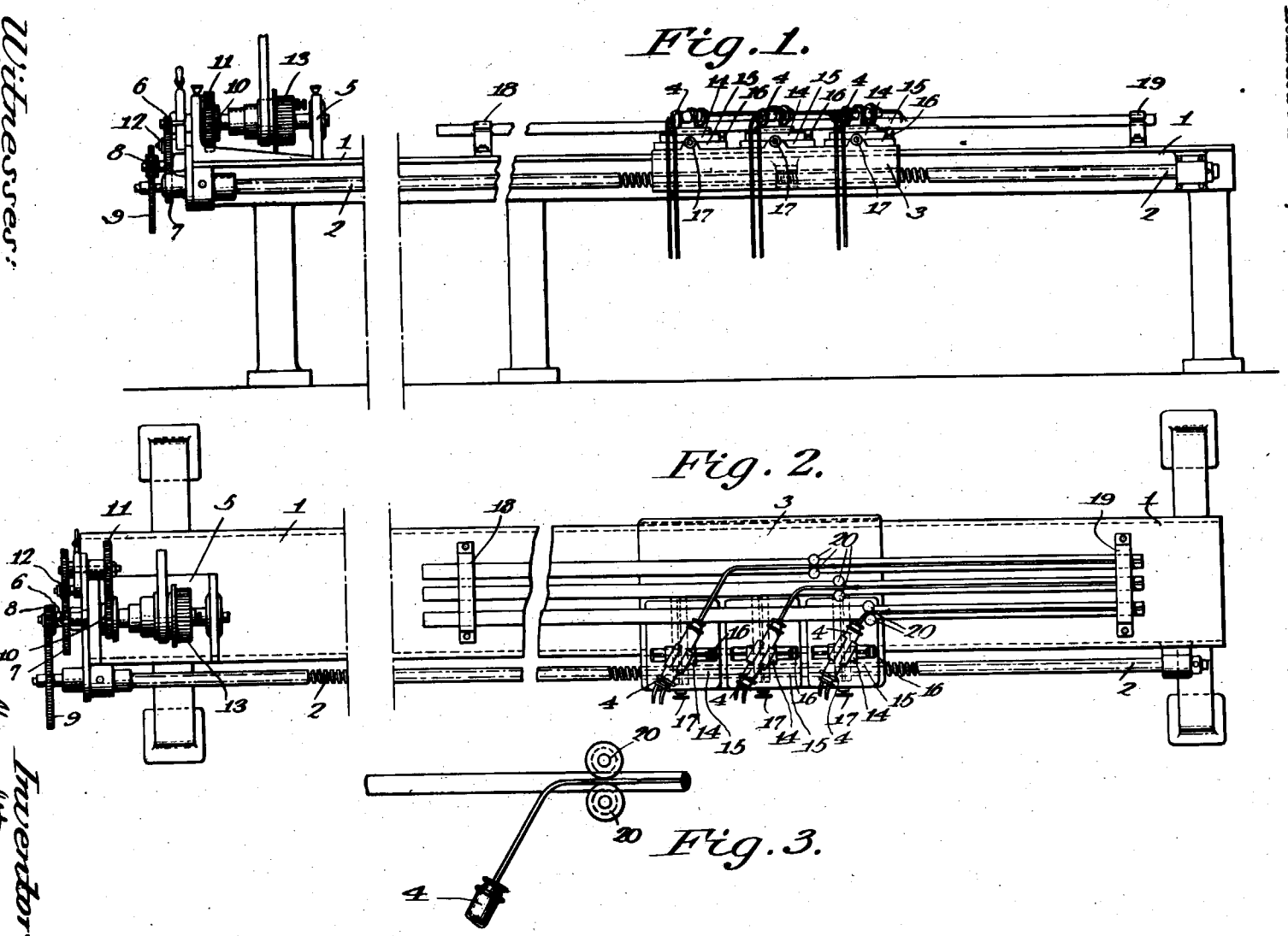
Witnesses:
R. L. Peterson
Langham Thom
Inventor:
Moïse Altman
by Chas. Dunn
his Attorney

UNITED STATES PATENT OFFICE.

MOÏSE ALTMAN, OF BAGNOLET, FRANCE, ASSIGNOR TO HARLAN ESKEY SNODGRASS, OF NEWARK, NEW JERSEY.

APPARATUS FOR WELDING THE MEETING EDGES OF METALLIC ARTICLES.

13,941. Specification of Reissued Letters Patent. Reissued June 29, 1915.

Original No. 961,394, dated June 14, 1910, Serial No. 400,800½. Application for reissue filed January 18, 1912. Serial No. 671,919.

*To all whom it may concern:*

Be it known that I, MOÏSE ALTMAN, a citizen of France, residing at Bagnolet, in the Department of the Seine and Republic of France, have invented certain new and useful Improvements in Apparatus for Welding the Meeting Edges of Metallic Articles; and I hereby declare the following to be a full, clear, and exact description thereof.

This invention has relation to apparatus for making seamless tubes and consists in the provision of novel means for supporting and securing the tubes to the bed of the apparatus and in the provision of a carriage carrying blow-pipe heating means, the parts being located and combined as hereinafter described.

Figure 1 represents the machine in longitudinal elevation, and Fig. 2 is a corresponding plan view. Fig. 3 is a detail top plan view illustrating the manner in which the edges of the tube are held together and the flame from the blow-pipe is directed upon the joint or seam.

The machine comprises a bed 1, identical with those employed in parallel lathes, the leading screw 2 being utilized for effecting the displacement of the carriage 3 carrying the blowpipe or blowpipes 4. In the example here given three blanks have been represented under treatment, so that three blowpipes are also provided, but a larger or a smaller number might equally well be treated.

The gear for driving the shaft 2 is located at 5, and as in turning lathes comprises a fixed headstock with direct drive through the pinions and wheels 6, 7, 8 and 9 and the direction of rotation of shaft 2 may be reversed by means of the pinions and wheels 10, 11 and 12 by unlocking the wheel 13. The advantage of this arrangement is that gearing up or down is greatly facilitated, so that the speed of rotation of the screw 2 or the displacement of the carriage 3 carrying the blowpipe 4 may readily be regulated in accordance with the work to be carried out. It also enables the work to be started at either end of the bed 1, so that it is not necessary to return the blowpipes 4 to their initial position. In such a case all that is necessary is to turn the blowpipes 4 in such a manner that their flames are still directed in the direction of the displacement of the carriage 3.

In order to render it possible to maintain the position of either of the blowpipes relatively to the blanks, or rather the point of contact of the flame with the edges to be fused or assembled by fusion, and also so as to permit of correcting any irregularities in the interval separating the flame and the edges to be assembled, if necessary during the travel of the carriage, a device similar to that utilized for controlling the slide rests of lathes may be utilized or attached to the carriage 3. In this case each of the blowpipe holders should be mounted on two slides 14 and 15, of which 14 is displaceable longitudinally by means of the hand wheel 16, while 15 is displaceable transversely by means of the hand wheel 17.

Two supports 18 and 19 arranged at each extremity of the blanks to be produced may be employed for holding them in place during operations. If considered necessary, a variable number of these supports may be distributed throughout the length of the blanks to afford them adequate support when dealing with large sizes. These supports are bolted to the bed or connected therewith in some other appropriate manner. In addition to this, in order to hold the edges of the blank well together while it is being presented to the blowpipe flame, rollers 20 are arranged slightly behind this flame and move with the corresponding blowpipes and thus insure efficient operation. When producing blanks of great length, a number of blowpipes may be utilized for each blank; these blowpipes should be mounted on separate carriages, thus rendering it possible to fuse the blanks at several points and thereby increasing the rate of manufacture.

I claim—

1. In an apparatus for welding the meeting edges of metallic articles, the combination with means for supporting the article to be welded, of a blow pipe adapted to direct an oxy-acetylene flame along the edges to be welded, said flame being disposed in the plane of the seam and inclined at an acute angle to the direction of relative movement between the flame and the seam whereby the meeting edges of the article are welded together without cutting the same, and means for maintaining the relation between the flame and the seam being welded throughout the welding operation.

2. In an apparatus for welding the meeting edges of sheet metal tubes for effecting a butt weld and producing a substantially seamless tube, the combination with means for supporting the article to be welded, of a carriage movable relatively to said supporting means, a blow pipe adjustably supported by said carriage and adapted to direct a flame against said article, said flame being disposed in a plane passing between the edges to be joined and intersecting the longer axis of the tube, and being inclined at an acute angle in the direction in which the carriage is traveling whereby said meeting edges are welded together without cutting said article, and means for maintaining a fixed relation between the flame and the edges being welded throughout the welding operation.

3. In an apparatus for making seamless tubes, comprising a bed, a carriage mounted above and on the bed and movable along the same, supports mounted above and on the bed and near opposite ends thereof, and a blow-pipe heating means carried by the carriage.

4. In apparatus for welding the meeting edges of metallic articles, the combination of the bed of the apparatus, means for supporting the articles to be welded above the bed, a carriage movable longitudinally of said bed, blow-pipe welding means supported by said carriage and adapted to direct a flame against said article at an acute angle to the meeting edges thereof whereby said edges are welded together without cutting said article, means for adjusting said welding means longitudinally in said carriage, and means for adjusting said welding means transversely in said carriage.

MOÏSE ALTMAN.

Witnesses:
H. C. Coxe,
Louis Moses.